(12) United States Patent
Refaat et al.

(10) Patent No.: US 11,950,166 B2
(45) Date of Patent: Apr. 2, 2024

(54) PREDICTING OCCUPANCY PROBABILITIES OF SURROUNDING AGENTS

(71) Applicant: Waymo LLC, Mountain View, CA (US)

(72) Inventors: Khaled Refaat, Mountain View, CA (US); Kai Ding, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 525 days.

(21) Appl. No.: 16/847,528

(22) Filed: Apr. 13, 2020

(65) Prior Publication Data

US 2021/0319287 A1    Oct. 14, 2021

(51) Int. Cl.
| | | |
|---|---|---|
| H04W 4/02 | (2018.01) | |
| G06F 18/214 | (2023.01) | |
| G06F 18/2321 | (2023.01) | |
| G06N 3/044 | (2023.01) | |
| G06N 3/045 | (2023.01) | |

(Continued)

(52) U.S. Cl.
CPC .......... *H04W 4/027* (2013.01); *G06F 18/214* (2023.01); *G06F 18/2321* (2023.01); *G06N 3/044* (2023.01); *G06N 3/045* (2023.01); *G06N 3/047* (2023.01); *G06N 3/049* (2013.01); *G06N 3/08* (2013.01); *G06N 20/00* (2019.01);

(Continued)

(58) Field of Classification Search
CPC .. G06N 3/0472; G06N 3/0445; G06N 3/0454; G06N 3/049; G06N 3/08; G06N 20/00; G06N 3/084; G06K 9/6221; G06K 9/6256; G06V 20/56; G06V 10/764; G06V 10/82; H04W 4/027; H04W 4/029; H04W 4/40
See application file for complete search history.

(56) References Cited

U.S. PATENT DOCUMENTS

| | | | |
|---|---|---|---|
| 10,140,254 B2* | 11/2018 | Karpov | ............... G06F 17/18 |
| 2021/0287297 A1* | 9/2021 | Hayward | ............... G10L 15/26 |
| 2021/0302960 A1* | 9/2021 | McGill, Jr | ............ G08G 1/0108 |

OTHER PUBLICATIONS

Kim et al., "Probabilistic Vehicle Trajectory Prediction over Occupancy Grid Map via Recurrent Neural Network," https://arxiv.org/abs/1704.07049v2, last revised Sep. 2017, 6 pages.

(Continued)

*Primary Examiner* — James J Yang
(74) *Attorney, Agent, or Firm* — Fish & Richardson P.C.

(57) ABSTRACT

Methods, systems, and apparatus, including computer programs encoded on computer storage media, for determining occupancies of surrounding agents. One of the methods includes obtaining scene data characterizing an environment at a current time point; processing a first network input generated from the scene data using a first neural network to generate an intermediate output; obtaining an identification of a future time point that is after the current time point; and generating, from the intermediate output and the future time point, an occupancy output, wherein the occupancy output comprises respective occupancy probabilities for each of a plurality of locations in the environment, wherein the respective occupancy probability for each location characterizes a likelihood that one or more agents will occupy the location at the future time point.

19 Claims, 7 Drawing Sheets

(51) Int. Cl.
*G06N 3/047* (2023.01)
*G06N 3/049* (2023.01)
*G06N 3/08* (2023.01)
*G06N 20/00* (2019.01)
*G06V 10/764* (2022.01)
*G06V 10/82* (2022.01)
*G06V 20/56* (2022.01)
*H04W 4/029* (2018.01)

(52) U.S. Cl.
CPC ............ *G06V 10/764* (2022.01); *G06V 10/82* (2022.01); *G06V 20/56* (2022.01); *H04W 4/029* (2018.02)

(56) References Cited

OTHER PUBLICATIONS

Park et al., "Sequence-to-Sequence Prediction of Vehicle Trajectory via LSTM Encoder-Decoder Architecture," https://arxiv.org/abs/1802.06338v3, last revised Oct. 2018, 7 pages.

* cited by examiner

PREDICTING OCCUPANCY PROBABILITIES OF SURROUNDING AGENTS

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes how a vehicle, e.g., an autonomous or semi-autonomous vehicle, can generate one or more occupancy outputs using an occupancy prediction system. Each occupancy output characterizes, for each of multiple locations in the environment of the vehicle, a respective predicted likelihood that the location will be occupied by another agent in the environment at a particular future time.

The occupancy prediction system can receive as input i) scene data characterizing an environment and ii) one or more identifications of respective requested future time points, and process the input to generate an occupancy output corresponding to each of the requested future time points. In particular, the occupancy prediction system can process the scene data using an embedding neural network to generate an intermediate output, and then, for each requested future time point, process i) the intermediate output and ii) the identification of the requested future time point to generate the occupancy output corresponding to the requested future time point.

In some implementations, the intermediate output is a machine-learned embedding of the input. In this specification, an embedding is an ordered collection of numeric values that represents an input in a particular embedding space. For example, the embedding can be a vector of floating point or other numeric values that has a fixed dimensionality. In these implementations, the occupancy prediction system can include a neural network that processes the intermediate output and a representation of each requested future time point to generate the respective occupancy outputs.

In some other implementations, the intermediate output includes, for each location in the environment, i) two future time points that define a future time interval and ii) a score that characterizes the likelihood that an agent will occupy the location in the future time interval. In these implementations, the occupancy prediction system can determine the respective occupancy output for each requested future time point directly from this intermediate output.

Once the occupancy prediction system has been trained, the trained occupancy prediction system can be deployed on a vehicle and can be used by the vehicle to make autonomous or semi-autonomous driving decisions.

Particular embodiments of the subject matter described in this specification can be implemented so as to realize one or more of the following advantages.

Some existing techniques for generating predicted occupancy outputs rely on predicted future paths of surrounding agents. For a given surrounding agent, a separate prediction system would generate one or more predicted future paths of the agent, each with a respective probability. An occupancy prediction system would then receive these predicted paths and, for each location in the environment, infer an occupancy probability from the predicted paths. The occupancy prediction system, therefore, was not trained directly on real-world training examples, but rather the predictions were inferred indirectly.

In some embodiments described in this specification, the machine learning models of the occupancy prediction system is trained directly on training examples generated by vehicles operating in the real world. Particularly, these training examples were gathered over many driving hours and by many different autonomous vehicles. This direct training can yield more accurate predictions than existing techniques, and can allow the occupancy prediction system to learn non-linear features of the surrounding environment, characterizing interactions between one or more surrounding agents and the vehicle that are important for predicting occupancy. Existing techniques that rely on respective predicted future paths for a single isolated agent when generating an occupancy output cannot take non-linear interactions into account.

Using techniques described in this specification, an occupancy prediction system can generate respective occupancy probabilities for each of multiple surrounding agents in a single forward pass. This is an improvement over existing techniques that generate an occupancy prediction for a single surrounding agent at a time, and then combine the occupancy predictions for each surrounding agent to generate the occupancy output. Generating an occupancy output in a single forward pass, regardless of the number of surrounding agents in the environment, can significantly decrease the computation time of the occupancy prediction system, which is a particularly useful feature for a system that is deployed on-board a vehicle.

Some other existing systems rely on multiple neural networks that each generate a prediction corresponding to a single predetermined future time point, and have to be trained separately. Then at inference time, the on-board system has to run each of the neural networks separately to generate respective occupancy outputs for each of the predetermined future time points. However, often a time limitation makes it infeasible for an on-board occupancy prediction system to perform more than one or a few inference calls before the occupancy prediction system is required to provide the occupancy predictions to a planning system on-board the vehicle. Furthermore, these existing systems only allow the on-board system to generate occupancy outputs corresponding to the predetermined set of future time points for which the neural networks have been trained.

Using techniques described in this specification, an occupancy prediction system can generate an occupancy output for any requested future time point, even future time points for which the occupancy prediction system was not explicitly trained. The system can also efficiently generate an occupancy output for multiple requested future time points by sharing the intermediate representation. That is, the system can process the input scene data once using a neural network to generate the intermediate representation, and then, for each requested future time point, process the intermediate representation and the requested future time point using an occupancy output generation subsystem to generate the respective occupancy output. If the occupancy output generation subsystem is smaller, e.g., has fewer parameters or takes less time to execute, than the embedding neural network, then sharing the intermediate representation when generating occupancy outputs for multiple requested future time points can greatly increase the efficiency of the system. Furthermore, in some implementations described in this specification, an occupancy prediction system can directly determine the respective occupancy outputs for each requested future time point from the intermediate output, without needing to process the intermediate output using another machine learning model; this capability further increases the efficiency of the system.

Using these techniques, a planning system for an autonomous vehicle can submit requests for occupancy outputs corresponding to particular future time points, where the particular future time points are selected by the planning system at runtime. The planning system can therefore determine precise future time points that will help the planning system make decisions, given the current state of the environment. As a particular example, if the situation demands it then the planning system can request an occupancy output for 3.89 seconds in the future, even if the occupancy prediction system has never generated an occupancy output for that particular requested future time point.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as an "occupancy prediction system," to generate an occupancy output corresponding to each of one or more future time points.

In this specification, a "surrounding agent" can refer, without loss of generality, to a vehicle, bicycle, pedestrian, ship, drone, or any other moving object. This specification also describes how training examples generated by vehicles can be used to effectively train the occupancy prediction system to accurately and reliably make predictions.

Figure 1:
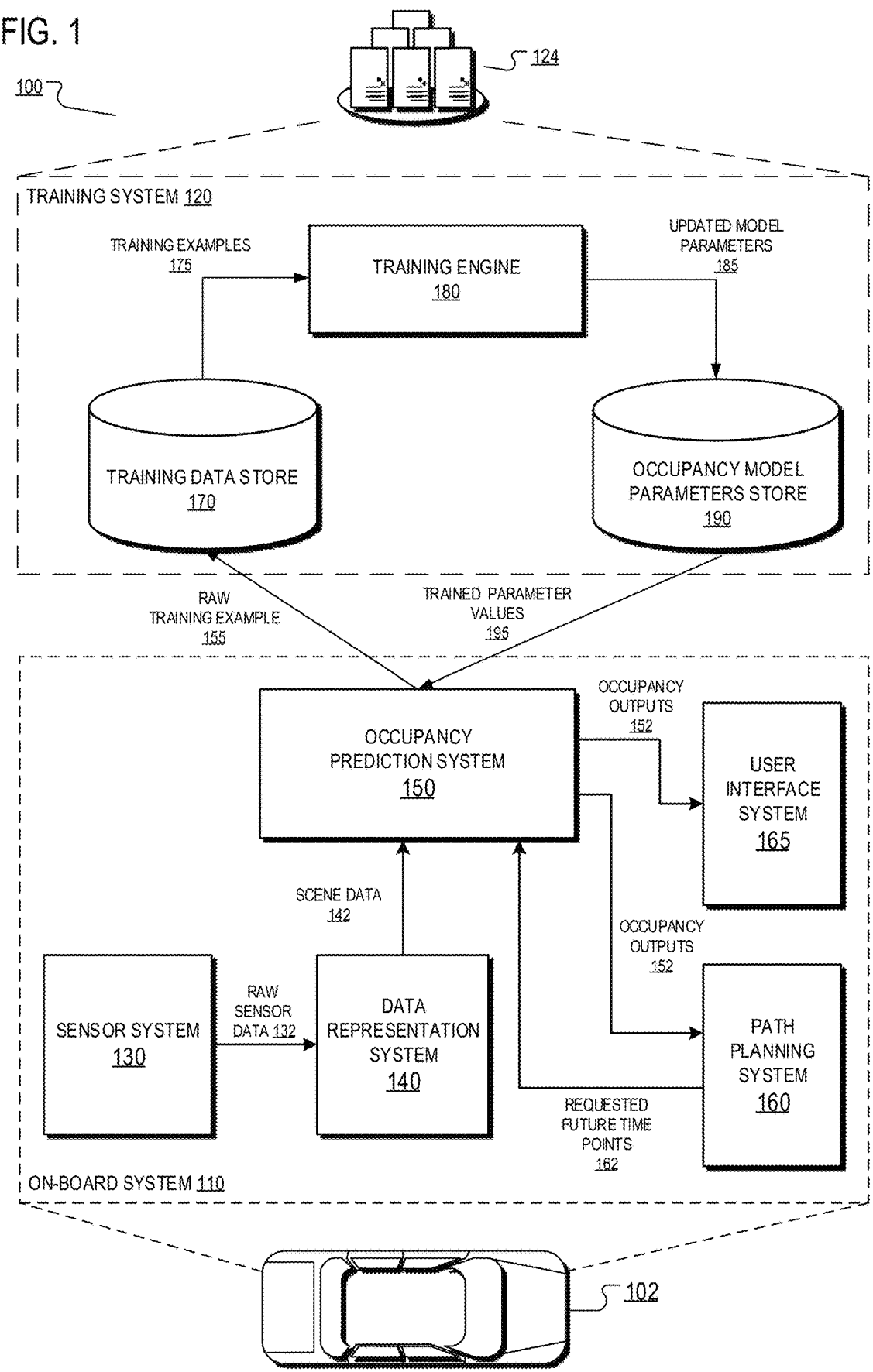
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and generates scene data 142. The scene data 142 characterizes the environment surrounding the vehicle 102. The scene data can include, for each surrounding agent, a current state at the current time point, where the state of an agent at a time point can include the location of the agent at the time point and values for a predetermined set of motion parameters at the time point. As a particular example, the motion parameters can include a heading for the agent, a velocity of the agent, and/or an acceleration of the agent. In some implementations, the scene data also includes, for each surrounding agent, a previous state at one or more respective previous time points, and/or a predicted future state at one or more respective future time points. In some implementations, the scene data also includes i) a current state of the vehicle at the current time point, ii) a previous state of the vehicle at one or more respective previous time points, and/or iii) a planned future state of the vehicle at one or more respective future time points. In some implementations, the scene data also includes a road graph of the environment, which can include the lanes of the road, cross walks, traffic lights, stop signs, etc., in the environment. Example data representation systems 140 and example scene data 142 is described in more detail below in reference to FIGS. 2A and 2B.

The data representation system 140 provides the scene data 142 to an occupancy prediction system 150, also on-board the vehicle 102.

The on-board system 110 also includes a path planning system 160. The path planning system 160 can make autonomous or semi-autonomous driving decisions for the vehicle 102, e.g., by generating a planned vehicle path that characterizes a path that the vehicle 102 will take in the future. In order to make driving decisions, the path planning system 160 can require an occupancy output at each of one or more particular requested future time points 162. The future time points for which the path planning system 160 requests an occupancy output can be determined ad hoc at runtime, according to the current state of the environment and requirements of the path planning system 160.

For example, the path planning system 160 may require a different time horizon based on the speed of the vehicle 102; e.g., if the vehicle 102 is going relatively fast, then a shorter time horizon might be required in order to react in time to potential collisions. As another example, the path planning system 160 may require a different time horizon based on a distance to the vehicle 102 of the closest surrounding agent; e.g., if the closest surrounding agent is relatively close to the vehicle 102, then a shorter time horizon might be required in order to react to a potential collision with the vehicle 102.

As another example, if the path planning system 160 determines a collision is likely to occur in 10 seconds, then the path planning system 160 may request occupancy outputs corresponding to 2 seconds, 4 seconds, 6 seconds, and 8 seconds in the future, in order to determine how to avoid the likely collision. In this way, the path planning system 160 can refine its understanding about the future around a particular future time point of interest (in this case, 10 seconds in the future).

As another example, the path planning system 160 can use a search algorithm, e.g., binary search or jump search, to refine its understanding around the future time point of interest. For example, after determining that a surrounding agent will, with high probability, occupy the planned path of the vehicle 102 in 10 seconds, the path planning system 160 may wish to determine the shortest time horizon at which the surrounding agent will occupy the planned path of the vehicle 102. If the shortest time horizon is 0.5 seconds, then the path planning system 160 may determine to harshly brake. If the shortest time horizon is 9.5 seconds, then the path planning system 160 may determine to gently brake. To find this time horizon, the path planning system 160 could perform a binary search, where the path planning system 160 first obtains an occupancy output corresponding to 5 second in the future. If the obtained occupancy output indicates that there is a high probability the surrounding agent will occupy the planned path of the vehicle in 5 seconds, then the path planning system 160 can obtain an occupancy output corresponding to 2.5 seconds in the future; if not, the path planning system 160 can obtain an occupancy output corresponding to 7.5 seconds in the future. The path planning system 160 can continue this pattern recursively until it determines the time horizon.

The path planning system provides the requested future time points 162 to the occupancy prediction system 150. For each requested future time point 162, the occupancy prediction system 150 processes the scene data 142 and the requested future time point 162 to generate an occupancy output 152 corresponding to the requested future time point 162. That is, if there are n requested future time points 162, then the occupancy prediction system generates n occupancy outputs 152. This process is described in more detail below in reference to FIG. 4.

In some cases, an occupancy output 152 for a requested future time point characterizes the environment surrounding the vehicle 102, where each position in the occupancy output 152 corresponds to a location in the environment and has an occupancy probability that characterizes the likelihood that any surrounding vehicle will occupy the corresponding location in the environment at the requested future time point. In some other cases, an occupancy output 152 for a requested future time point characterizes an environment surrounding a particular surrounding agent, where each position in the occupancy output 152 corresponds to a location in the environment surrounding the particular surrounding agent and has an occupancy probability that characterizes the likelihood that the particular surrounding agent will occupy the corresponding location in the environment at the requested future time point. In some such cases, the occupancy prediction system 150 can generate one occupancy output 152 per surrounding agent per requested future time point 162.

The on-board system 100 can provide the occupancy outputs 152 generated by the occupancy prediction system 150 to one or more other on-board systems of the vehicle 102, e.g., the path planning system 160 and/or a user interface system 165.

When the path planning system 160 receives the occupancy outputs 152, the path planning system 160 can use the occupancy outputs 152 to generate a new planned vehicle path. For example, the occupancy outputs 152 may contain a prediction that a particular surrounding agent is likely to cut in front of the vehicle 102, potentially causing a collision. In this example, the path planning system 160 can generate a new planned vehicle path that avoids the potential collision. For example, the path planning system 160 can generate a trajectory through the environment that causes the vehicle 102 to navigate through locations in the environment at respective future time points, such that each location has low occupancy probabilities at the corresponding future time point according to the occupancy outputs 152. The vehicle 102 can then navigate to follow the new planned path and avoid the potential collision.

When the user interface system 165 receives the occupancy outputs 152, the user interface system 165 can use the occupancy outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the occupancy outputs 152 may contain a prediction that a particular surrounding agent is likely to cut in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the occupancy outputs 152, the occupancy prediction system 150 can use trained parameter values 195 obtained from an occupancy model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the parameter values of the occupancy prediction system 150. The training data store 170 receives raw training examples from agents operating in the real world. For example, the training data store 170 can receive a raw training example 155 from the agent 102 and one or more other agents that are in communication with the training system 120. The raw training example 155 can be processed by the training system 120 to generate a new training example. The raw training example 155 can include the scene data 142 that can be used as input for a new training example. The raw training example 155 can also include outcome data characterizing the state of the environment surrounding the vehicle 102 at one or more future time points, e.g., the one or more requested future time points 162. This outcome data can be used to generate ground-truth outputs for the new training example, where each ground-truth output is an occupancy output corresponding to a particular future time point. In some implementations, each ground-truth occupancy output for a future time point has '1's in positions corresponding to locations in the environment that are occupied by a surrounding agent at the future time point, and '0's in all other positions.

The training data store 170 provides training examples 175 to a training engine 180, also hosted in the training system 120. The training engine 180 uses the training examples 175 to update model parameters that will be used by the occupancy prediction system 150, and provides the updated model parameters 185 to the occupancy model parameters store 190. Once the parameter values of the occupancy prediction system 150 have been fully trained, the training system 120 can send the trained parameter values 195 to the occupancy prediction system 150, e.g., through a wired or wireless connection.

Figure 2A:
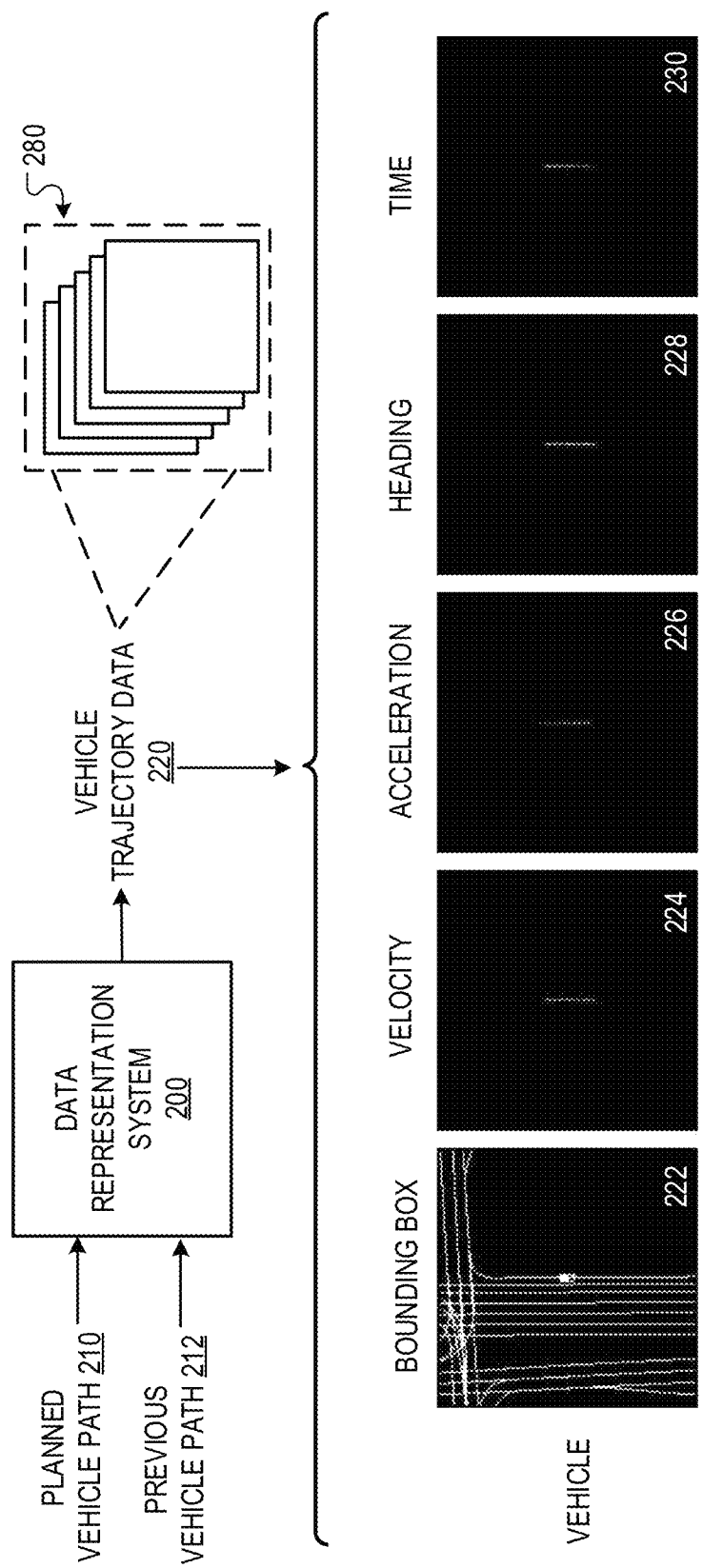
FIGS. 2A and 2B are block diagrams of an example data representation system for generating scene data.

FIG. 2A is a block diagram of an example data representation system 200 for generating scene data. The data representation system 200 is an example of a system implemented as computer programs on one or more computers in one or more locations in which the systems, components, and techniques described below are implemented.

In this example, the scene data includes vehicle trajectory data 220, which characterizes the trajectory of a vehicle through an environment, e.g., the vehicle 102 depicted in FIG. 1.

The data representation system 200 receives a planned vehicle path 210, which characterizes a path that a vehicle plans to travel in future time points. The planned vehicle path 210 can be generated by an on-board system of the vehicle, e.g., the path planning system 160 depicted in FIG. 1. The data representation system 200 also receives a previous vehicle path 212, which characterizes the path that the vehicle has travelled in previous time points, up to and including the current time point.

The data representation system 200 can process the planned vehicle path 210 and the previous vehicle path 212 to generate the vehicle trajectory data 220.

The vehicle trajectory data 220 is composed of multiple "channels". Each channel is a two-dimensional array of data values that represents a "top-down" perspective of the environment in the vicinity of the vehicle. Each position in each channel corresponds to a respective location in the environment and can be indexed by respective coordinates. Each of the channels have the same dimensionality (i.e., the same number of rows and columns), the same top-down perspective of the environment, and are aligned (i.e., registered) with one another. That is, positions which are indexed by the same coordinates in different channels correspond to the same location in the environment. In other words, corresponding positions in different channels correspond to the same location in the environment.

To represent the trajectory of the vehicle, the vehicle trajectory data 220 includes a vehicle time channel and respective vehicle motion parameter channels corresponding to each of a predetermined number of motion parameters. Each of the motion parameters characterizes a respective characteristic of the motion of the vehicle, for example, the velocity, acceleration, or heading of the vehicle. As depicted in FIG. 2A, the vehicle trajectory data 220 may include a vehicle time channel 230, a vehicle velocity channel 224, a vehicle acceleration channel 226, and a vehicle heading channel 228.

The vehicle time channel and the vehicle motion parameter channels represent the previous trajectory of the vehicle up to and including the current time point and a planned future trajectory of the vehicle after the current time point, derived from the planned vehicle path 210 and the previous vehicle path 212. More specifically, a planned future trajectory of the vehicle specifies, for each of multiple future time points after the current time point, a location in the environment that can be occupied by the vehicle at the future time point. For each of the multiple future time points, the planned future trajectory further specifies possible values of each of the predetermined number of motion parameters that characterize the motion of the vehicle at the future time point.

In some implementations, the planned vehicle path 210 includes multiple possible future paths of the vehicle. That is, for each future time point, the planned vehicle path 210 specifies multiple possible locations in the environment that can be occupied by the vehicle at the future time point, and multiple possible values for each of the motion parameters. In these cases, the generated vehicle trajectory data 220 can characterize each possible future trajectory of the vehicle.

The description which follows will refer to the previous vehicle trajectory up to and including the current time point and the planned future vehicle trajectory after the current time point together as the "full trajectory" of the vehicle.

The vehicle time channel represents the respective time points at which the vehicle occupies different locations in the environment in the full trajectory of the vehicle. Each motion parameter channel represents the values of the respective motion parameter characterizing the motion of the vehicle when the vehicle occupies different locations in the environment in the full trajectory of the vehicle. In particular, for each location in the environment which is occupied by the vehicle, the data value in the vehicle time channel which corresponds to the location defines the time point at which the vehicle occupies the location. Moreover, the data value in each respective vehicle motion parameter channel which corresponds to the location defines the value of the respective motion parameter characterizing the motion of the vehicle when the agent occupies the location in the environment.

Generally, the environment may include multiple locations which are not included in either the previous trajectory or the candidate future trajectory of the agent. For these locations, the data representation system 200 can set the data values in the vehicle time channel and the vehicle motion parameter channels which correspond to these locations to a default value (e.g., the value 0 or the value −1).

When the same location in the environment is occupied by the vehicle at multiple time points, then the data representation system 200 can set the respective data values in the vehicle time channel and motion parameter channels which correspond to the location to any appropriate values. For example, the data representation system 200 can set the respective data values in the vehicle time channel and motion parameter channels which correspond to the location in accordance with the last time point when the vehicle occupies the location. That is, the data representation system 200 can set the data value in the vehicle time channel which corresponds to the location to define the last time point when the vehicle occupies the location. Moreover, the data representation system 200 can set the respective data values in the vehicle motion parameter channels to define the values of the respective motion parameters characterizing the motion of the vehicle when the vehicle last occupies the location.

In some implementations, the data representation system 200 can include further channels in the vehicle trajectory data 220 in addition to the time channels and motion parameter channels. For example, the vehicle trajectory data 220 can include a road-graph channel, a vehicle localization channel, or both. A road-graph channel represents a known geometry of the environment in the vicinity of the vehicle. For example, the road-graph channel may represent the positions of different features of the environment, including: the road, different lanes in the road, crosswalks, traffic lights, construction zones, school zones, and the like. A vehicle localization channel represents the location of the vehicle in the environment at the current time point (e.g., as defined by a bounding box). In the example depicted in FIG. 2A, the road-graph channel and the vehicle localization channel are superimposed onto a single channel 222.

Figure 2B:
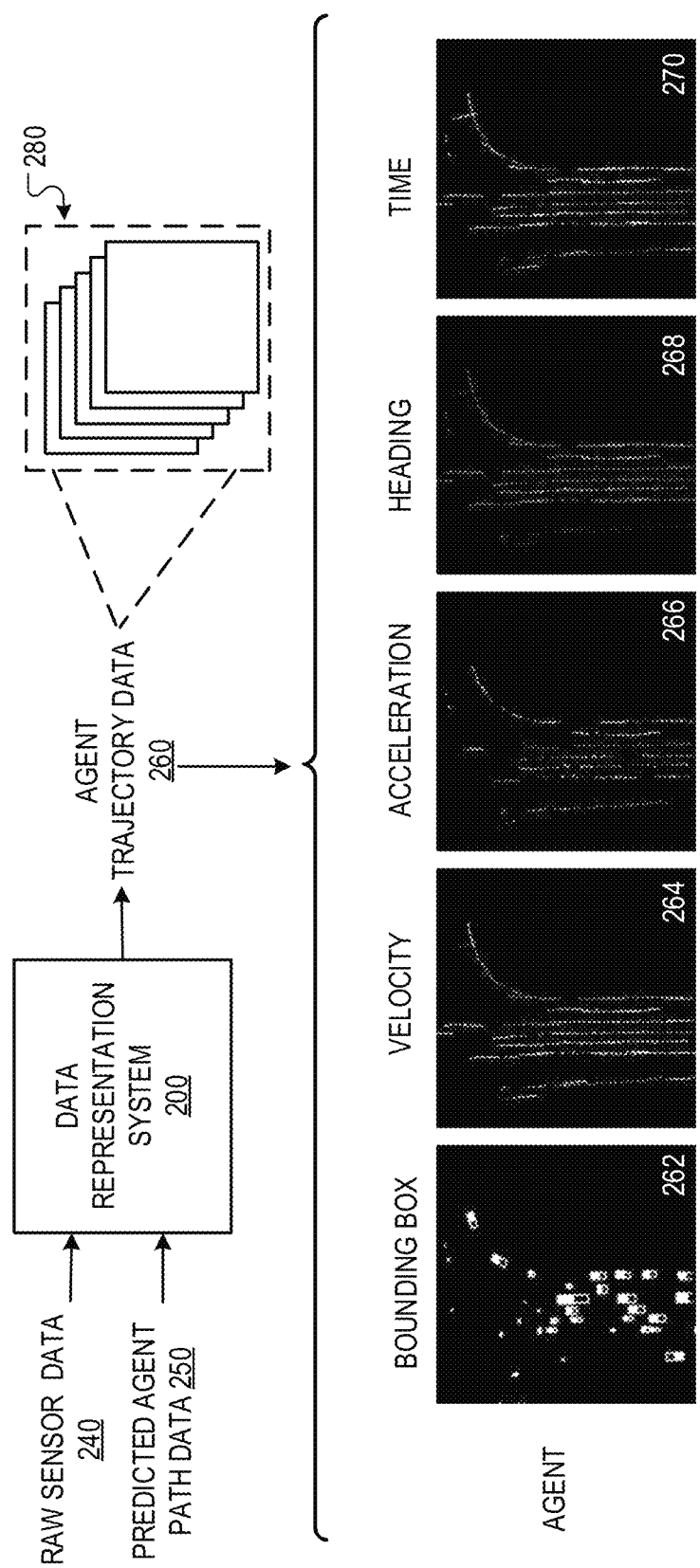

FIG. 2B is another block diagram of the example data representation system 200 for generating scene data.

In this example, the scene data includes agent trajectory data 220, which characterizes the trajectory of agents in the environment in the vicinity of the vehicle.

The data representation system 200 receives raw sensor data 240 characterizing the current state of each of the surrounding agents in the current time point, as well as a previous state for each of the surrounding agents at one or more previous time points. That is, the raw sensor data 240 characterizes the trajectory of each surrounding agent up to and including the current time point. The data representation system 200 also receives predicted agent path data 250, which characterizes a prediction, for each surrounding agent, of the path that the agent will take in the future. For example, the predicted agent path data 250 can be generated by an on-board path prediction system of the vehicle. In some implementations, the predicted agent path data 250 includes multiple possible future paths for each agent. That is, for each future time point and for each surrounding agent, the predicted agent path data 250 specifies multiple possible locations in the environment that can be occupied by the surrounding agent at the future time point, and multiple possible values for each of the motion parameters. In these cases, the generated agent trajectory data 260 can characterize each possible future trajectory of the surrounding agents.

To represent the trajectories of the surrounding agents, the agent trajectory data 260 includes an agent time channel and respective agent motion parameter channels corresponding to each of the predetermined number of motion parameters. As depicted in FIG. 2B, the agent trajectory data 260 may include an agent time channel 270, an agent velocity channel 364, an agent acceleration channel 266, and an agent heading channel 268.

The agent time channel and the agent motion parameter channels jointly represent the previous trajectories of the agents up to the current time point and the predicted future trajectories of the agents after the current time point, derived from the predicted agent path data 250 and the raw sensor data 240. A predicted future trajectory of an agent specifies, for each of multiple future time points after the current time point, a location in the environment that can be occupied by the agent at the future time point. For each of the multiple future time points, the predicted future trajectory further specifies possible values of each of the predetermined number of motion parameters that characterize the motion of the agent at the future time point. The description which follows will refer to the previous agent trajectories up to and including the current time point and the planned future agent trajectories after the current time point together as the "full trajectory" of the agents.

The agent time channel jointly represents the respective time points at which the agents occupy different locations in the environment in the full trajectories of the agents. Each agent motion parameter channel represents the values of the respective motion parameters characterizing the motion of the agents when the agents occupy different locations in the environment in the full trajectories of the agents. In particular, for each location in the environment which is occupied by one of the agents, the data value in the agent time channel which corresponds to the location defines the time point at which the agent occupies the location. Moreover, the data value in each respective agent motion parameter channel which corresponds to the location defines the value of the respective motion parameter characterizing the motion of the agent when the agent occupies the location in the environment.

Generally, the environment may include multiple locations which are not included in either the previous trajectory or the predicted future trajectory of any of the agents. For these locations, the data representation system 200 can set the data values in the agent time channel and the agent motion parameter channels which correspond to these locations to a default value (e.g., the value 0 or the value −1).

When the same location in the environment is occupied by agents at multiple time points, then the data representation system 200 can set the respective data values in the agent time channel and agent motion parameter channels which correspond to the location to any appropriate values. For example, the data representation system 200 can set the respective data values in the agent time channel and agent motion parameter channels which correspond to the location in accordance with the last time point when one of the agents occupies the location.

In some implementations, an agent localization channel (e.g., the agent localization channel 262) jointly represents the positions of each of the vehicles in the environment at the current time point (e.g., as defined by bounding boxes).

By jointly representing the trajectories of the agents using a single agent time channel and a single agent motion parameter corresponding to each motion parameter, the data representation system 200 can generate agent trajectory data 260 with a predetermined dimensionality irrespective of the (variable) number of agents. In this manner, the agent trajectory data 260 generated by the data representation system 200 can be readily processed by a cut-in prediction system, which is configured to process agent trajectory data 260 of the predetermined dimensionality.

Referring to FIG. 2A and 2B together, in some implementations the data representation system 200 generates the vehicle trajectory data 220 and the agent trajectory data 260 together by aligning and channel-wise concatenating the generated channels, as depicted by 280 in both FIG. 2A and FIG. 2B. That is, combined trajectory data is generated by concatenating all generated channels. By implicitly representing the respective trajectories of the vehicle and the agents in this format, the data representation system 200 can generate a representation which is both compact and can be effectively processed by an occupancy prediction system. In particular, the occupancy prediction system may include a convolutional neural network. The occupancy prediction system can process the combined trajectory data using convolutional neural network layers defined by multi-dimensional (e.g., two- or three-dimensional) convolutional filters, thereby enabling the occupancy prediction system to learn complex spatial relationships between different spatial regions of the environment.

Figure 3:
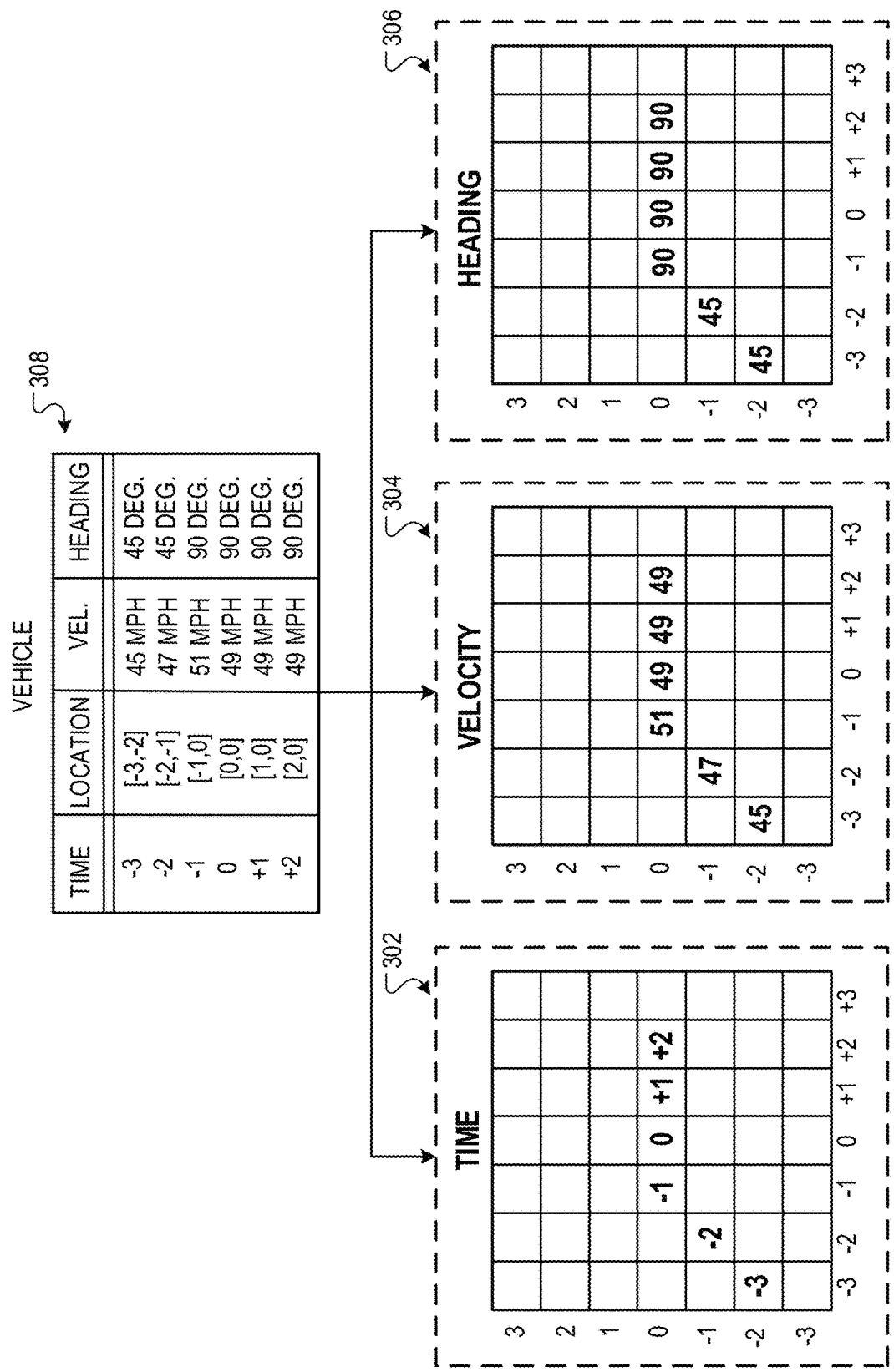
FIG. 3 is an illustration of an example process by which a data representation system can generate channels.

FIG. 3 is an illustration of an example process by which a data representation system can generate a vehicle time channel 302, a vehicle velocity channel 304, and a vehicle heading channel 306, which represent a trajectory of the vehicle up to and including the current time point and a planned future trajectory of the vehicle after the current time point.

The data which defines the previous trajectory of the vehicle and the planned future trajectory of the vehicle is represented in a tabular format 308. Each row of the table defines a time point, a location the vehicle occupies in the environment at the time point, a velocity of the vehicle at the time point, and a heading of the vehicle at the time point.

For example, the first row of the table 308 defines that at time point −3 (e.g., 3 seconds before the current time point), the location occupied by the vehicle in the environment is defined by the coordinates [−3,−2] in the channel frame of reference, the velocity of the vehicle is 45 mph, and the heading of the vehicle is 45 degrees (e.g., clockwise from North). The coordinates [−3,−2] are expressed in the channel frame of reference and can be mapped to express a location in an environment frame of reference. For example, the coordinates in the channel frame of reference may represent 5 foot increments in a North-South-East-West environment frame of reference which is centered on the vehicle. In this example, the coordinates [−3,−2] in the channel frame of reference may represent a location in the environment which is 15 feet West and 10 feet South of the location occupied by the vehicle at the current time point. As another example, the last row of the table 308 defines that at time point +2 (e.g., 2 seconds after the current time point), the location the vehicle occupies (i.e., according to the planned future trajectory) is defined by the coordinates [2,0] in the channel frame of reference, the velocity of the agent is 49 mph, and the heading of the agent is 90 degrees.

The data representation system sets the data values in the vehicle time channel corresponding to locations [−3,−2], [−2,−1], [4,0], [0,0], [1,0], and [2, 0] to the respective time points −3, −2, −1, 0, +1, and +2 at which the vehicle occupies the respective locations. For clarity, the data values in the vehicle time channel corresponding to the other locations are shown as blank. Generally, the data representation system sets the data values in the vehicle time channel corresponding to the other locations to a default value (e.g., the value 0 or the value −1). Similarly, the data representation system sets the data values in the vehicle velocity channel corresponding to locations [−3,−2], [−2,−1], [4,0], [0,0], [1,0], and [2, 0] to the respective velocity values 45, 47, 51, 49, 49, and 49 which define the velocity (in mph) of the vehicle when the vehicle occupies the respective locations. Similarly, the data representation system sets the data values in the vehicle heading channel corresponding to locations [−3,−2], [−2,−1], [4,0], [0,0], [1,0], and [2, 0] to the respective heading values 45, 45, 90, 90, 90, and 90 which define the heading (in degrees) of the vehicle when the vehicle occupies the respective locations.

In some implementations, the data representation system determines the channel frame of reference to cause the location occupied by the vehicle at the current time point to correspond to the data value in the "center" of each of the channels. Generating trajectory data with a consistent channel frame of reference can facilitate training of the cut-in prediction system on the trajectory data.

Figure 4:
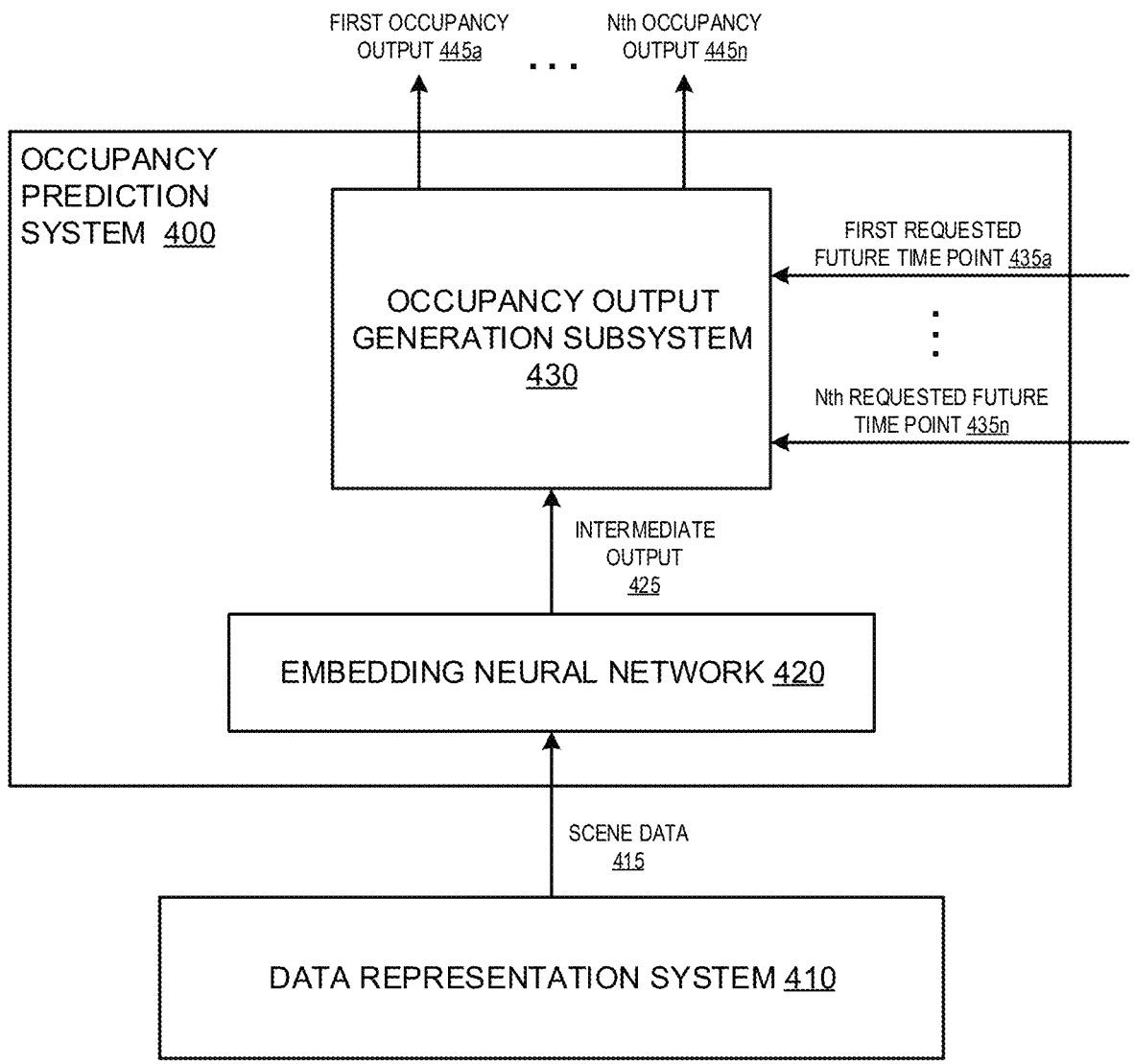
FIG. 4 is a block diagram of an example occupancy prediction system.

FIG. 4 is a block diagram of an example occupancy prediction system 400. The occupancy prediction system 400 is an example of a system implemented as computer programs on one or more computers in one or more locations in which the systems, components, and techniques described below are implemented.

A data representation system 410 provides scene data 415 to the occupancy prediction system 400 that characterizes an environment surrounding a vehicle. For example, the data representation system 410 might provide the scene data 415 in the channel format as described above in reference to FIGS. 2A, 2B, and 3.

The occupancy prediction system 400 includes an embedding neural network 420 and an occupancy output generation subsystem 430.

The embedding neural network 420 processes the scene data 415 to generate an intermediate output 425. For example, the intermediate output 425 can be the output of the final layer of the embedding neural network 420. In some implementations, the embedding neural network 420 is a convolutional neural network with multiple convolutional neural network layers. When the scene data 415 is represented as two-dimensional arrays, e.g., the channels depicted in FIGS. 2A and 2B, such a convolutional neural network can learn to exploit complex interactions between different spatial regions of the scene data 415 by processing the two-dimensional channels using multi-dimensional convolutional filters, thereby generating more accurate predictions.

In some implementations, the intermediate output 425 is a machine-learned embedding of the scene data 415. In some other implementations, the intermediate output 425. In some other implementations, the intermediate output 425 includes, for each location in the environment surrounding the vehicle, respective values that have a real-world meaning. As a particular example, for each location in the environment, the intermediate output 425 can include i) two future time points that define a future time interval and ii) a score that characterizes the likelihood that an agent will occupy the location in the future time interval. Different implementations of the intermediate output 425 are discussed in more detail below.

The occupancy output generation subsystem 430 receives the intermediate output 425 and n requested future time points 435a-n, and generates n occupancy outputs 445a-n. That is, for each requested future time point 435i, the occupancy output processes the intermediate output 425 and the requested future time point 435i to generate the $i^{th}$ occupancy output 445i that characterizes the environment at the particular requested future time point 435i. In some implementations, the requested future time points 435a-n can be provided to the occupancy prediction system 400 by a path planning system of the vehicle, e.g., the path planning system 160 depicted in FIG. 1.

In some implementations, each requested future time point is provided to the occupancy prediction system 400 as a floating point value, e.g., '2.1' to signify 2.1 seconds in the future. In some other implementations, each requested future time point is provided to the occupancy prediction system 400 as a one-hot encoding vector that has a '1' in a position corresponding to the requested future time point and a '0' in all other positions. That is, if each one-hot encoding vector has n positions, then there are n possible requested future time points for which the system can generate an occupancy output. In some other implementations, each requested future time point is provided to the occupancy prediction system as an embedding in a particular embedding space that is learned jointly with the parameters of the occupancy prediction system 400; that is, each requested future time point can be a dense vector that encodes the particular requested future time point.

In some implementations, the trained occupancy prediction system 400 can receive requested future time points that were not included in the training set on which the occupancy prediction system 400 was trained. For example, the first requested future time point 435a might be 2.196, signifying 2.196 seconds in the future. Even if the occupancy prediction system 400 has never generated an occupancy output for a requested future time point 2.196 seconds in the future, the occupancy prediction system 400 can generate the first occupancy output 445a corresponding to the first requested future time point 435a.

Generally, the occupancy output generation subsystem 430 is computationally 'cheaper' than the embedding neural network 420. That is, the occupancy output generation subsystem 430 can have fewer parameters than the embedding neural network, or for some other reason requires less time and/or fewer computational resources to execute than the embedding neural network 420. Therefore, the occupancy prediction system 400 must only process the scene data 415 using the 'expensive' embedding neural network 420 once, and then can efficiently process the intermediate output 425 using the 'cheap' occupancy output generation subsystem 430 multiple times, once for each requested future time point 435i.

Each occupancy output 445i for a requested future time point 435i can include respective occupancy probabilities for multiple locations in the environment, where each occupancy probability characterizes a likelihood that the corresponding location will be occupied by a surrounding agent at the requested future time point 435i.

In some implementations, each occupancy outputs 445i is a two-dimensional array of data values similar to the scene data depicted in FIGS. 2A and 2B, where the array represents a "top-down" perspective of the environment in the vicinity of the vehicle. Each position in the array corresponds to a respective location in the environment, and the value at each position corresponds to the occupancy probability of the respective location. Example two-dimensional occupancy outputs are described in more detail below in reference to FIG. 5.

As described above, in some implementations, the intermediate output 425 is a machine-learned embedding of the scene data 415. That is, the embedding neural network 420 encodes the information in the scene data 415 into a representation, e.g., a tensor, in an embedding space that is learned jointly with the parameters of the occupancy prediction system 400. The embedding neural network 420 can be trained to automatically learn the ideal intermediate representation. In these implementations, the occupancy output generation subsystem can include a neural network that processes the intermediate output 425 and a requested future time point 435i to generate each occupancy output 445i.

As a particular example, the scene data can include 100×100 pixels for each of n channels. The embedding neural network 420 can include several convolutional layers and several max pooling layers that decrease the size of the input channels, so that the intermediate output 425 is a single 50×50 or 25×25 matrix. The neural network in the occupancy output generation subsystem 430 can then include several fully-connected layers that learn nonlinear features of the intermediate output 425, and several deconvolution layers that increase the size of representation so that the output occupancy output is also 100×100. That is, in this particular example, the occupancy outputs 445a-n are the same resolution as the input channels of the scene data 415.

The final layer of neural network in the occupancy output generation subsystem can receive an un-normalized occupancy output that includes an un-normalized value for each location in the environment, and apply a sigmoid function to each un-normalized value to normalize the value to be between 0 and 1. Therefore, each value in the output occupancy output can represent a probability, between 0 and 1, that the corresponding location will be occupied at the future time point.

Note that, in this example, the occupancy output generation subsystem 430 does not explicitly enforce that the sum of all probabilities in the occupancy output is equal to the number of surrounding agents in the environment at the current time point. There are multiple factors that can cause the sum of all occupancy probabilities in an occupancy output to be different than the number of agents in the environment. Agents that are not in the environment at the current time point could enter the environment between the current time point and the future time point corresponding to the occupancy output; in these cases, the sum of the probabilities should be greater than the number of surrounding agents in the environment at the current time point. Agents that are in the environment at the current time point could leave the environment between the current time point and the future time point corresponding to the occupancy output; in these cases, the sum of the probabilities should be less than the number of surrounding agents in the environment at the current time point. In some cases, a single surrounding agent could occupy multiple different locations in the environment at the future time point, e.g., if the surrounding agent is on a boundary between a first location and a second location in the environment.

Generally, the sum of all occupancy probabilities in an occupancy output is proportional to the number of surrounding agents in the environment, but the relationship is highly complicated. In this example, this relationship does not need to be explicitly encoded into the occupancy output generation subsystem 430, but instead can be learned during training of the neural network.

In some implementations in which the intermediate output 425 is a machine-learned embedding of the scene data 415, the neural network in the occupancy output generation subsystem 430 can be trained using a ground-truth occupancy outputs for respective future time points that include '1's in positions corresponding to locations in the environment that are occupied by a surrounding agent at the future time point, and '0's in all other positions. A training system can determine an error, e.g., cross entropy error, between the predicted occupancy output generated by the neural network and the ground-truth occupancy output, and determine an update to the parameters of the neural network using the error, e.g., using backpropagation.

In some implementations in which the intermediate output 425 is a machine-learned embedding of the scene data 415, the embedding neural network 420 and the occupancy output generation subsystem 430 can be trained end-to-end. That is, a training system can backpropagate errors through both the occupancy output generation subsystem 430 and the embedding neural network 420, determining updates to the parameters of each in parallel. In some other implementations, either the embedding neural network 420 or the occupancy output generation subsystem 430 can be "frozen" while training the other. That is, the system does not determine updates to the parameters of the "frozen" component during backpropagation.

As described above, in some other implementations, the intermediate output 425 includes, for each location in the environment surrounding the vehicle, interpretable values that have a real-world meaning, e.g., values for each position of the input channels of the scene data 425 corresponding to respective locations in the environment. For example, the intermediate output 425 can include i) two future time points that define a future time interval and ii) a score that characterizes the likelihood that a surrounding agent will occupy the location in the future time interval. That is, the score can characterize the likelihood that the predicted future time interval is accurate.

For example, there may be a 30% chance that an agent will occupy a particular location. In the event that the agent occupies the particular location, the agent enters the particular location 2.3 seconds in the future and exits the particular location 2.9 seconds in the future. In this example, the future time interval is defined by 2.3 and 2.9, and the score is 0.30.

In these implementations, the occupancy output generation subsystem 430 can generate an occupancy output for a particular requested future time point 435$i$ directly from the intermediate output 425. For each location in the environment, the occupancy output generation subsystem determines if the requested future time point 435$i$ is in the future time interval corresponding to the location. If the requested future time point 435$i$ is in the future time interval, then the occupancy output generation subsystem 430 determines the occupancy probability for the location to be the score corresponding to the location. Otherwise, the occupancy output generation subsystem 430 determines the occupancy probability for the location to be 0.

For example, consider the above example, where a location has a future time interval defined by 2.3 and 2.9, and a score of 0.30 characterizing the likelihood that an agent will occupy the location in the predicted future time interval. If a first requested future time point is 2.5, then the occupancy output generation subsystem 430 will determine that $2.3 \leq 2.5 \leq 2.9$, and therefore the occupancy probability for the location at the first requested future time point will be 0.30. If a second requested future time point is 2.1 or 3.1, then the occupancy output generation subsystem 430 will determine that $2.1 < 2.3$ and $2.9 < 3.1$, and therefore the occupancy probability for the location at the second requested future time point will be 0.

As a particular example, the intermediate output 425 can generate three two-dimensional arrays. Each two-dimensional array can include an element for each location in the environment. Elements in the first two-dimensional array can characterize the future time point that defines the beginning of the future time interval for the corresponding location, elements in the second two-dimensional array can characterize the future time point that defines the end of the future time interval for the corresponding location, and elements in the third two-dimensional array can characterize the score for the corresponding location. The embedding neural network 420 can be a convolutional neural network that has three branches, where each branch produces a respective two-dimensional array. A neural network layer of the third branch of the embedding neural network 420 can apply a sigmoid activation function to the third two-dimensional array to enforce that each element is a value between 0 and 1. Respective neural network layers of the first and second branches of the embedding neural network 420 can apply a RELU activation function to the first two-dimensional array and the second two-dimensional array, respectively, to enforce that each element is non-negative.

These implementations can be particularly efficient when generating multiple occupancy outputs, because the occupancy output generation subsystem 430 does not have to process the intermediate output 425 with another neural network, but rather can infer the occupancy outputs directly from the intermediate output 425.

In some such implementations, the intermediate output 415 includes three values for each location in the environment, where the three values characterize the predicted future occupancies of all the surrounding agents collectively. That is, for each location, the intermediate output 425 includes a two values defining a future time interval and a score characterizing the likelihood that any agent in the environment agent occupies the location in the time horizon defined by the first value and the second value. If multiple surrounding agents are predicted to enter and exit the location in the future, then the first value defining the future time interval can characterize the future time point at which the location is first occupied by a surrounding agent, and the second value defining the future time interval can characterize the future time point at which the last surrounding agent exits the location.

In some other such implementations, the intermediate output 415 includes three values per surrounding agent for each location in the environment. That is, for each particular surrounding agent and for each location, the intermediate output 425 includes two values defining a future time interval and a score characterizing the likelihood that the particular agent occupies the location in the defined future time interval. Then, when generating the occupancy probability corresponding to a location for a particular requested future time point, the occupancy output generation subsystem 430 can determine whether the requested future time point is in the future time interval corresponding to the location for any particular surrounding agent. If so, then the occupancy probability for the location can be determined to be the score corresponding to the location for the particular surrounding agent.

In some such implementations, the embedding neural network 420 can be trained using ground truth training examples that include, for each location, ground-truth values for each of the three values generated by the embedding neural network 420. The ground-truth score corresponding to a location is 1 if a surrounding agent did occupy the location at any point in the future (up to a maximum time horizon, e.g., 5, 10, 30, or 60 seconds), and 0 if not. The ground-truth future time interval corresponding to a location can be the actual time interval in which the location was occupied (up to the maximum time horizon) if the location was occupied, and can be a default value (e.g., −1 for both values defining the future time interval) if the location was not occupied. During training, the parameters of the embedding neural network 420 can be updated using backpropagation using cross-entropy loss on the score, and using any regression loss, e.g., quadratic loss or mean-squared error, on the two values that define the future time interval.

Figure 5:
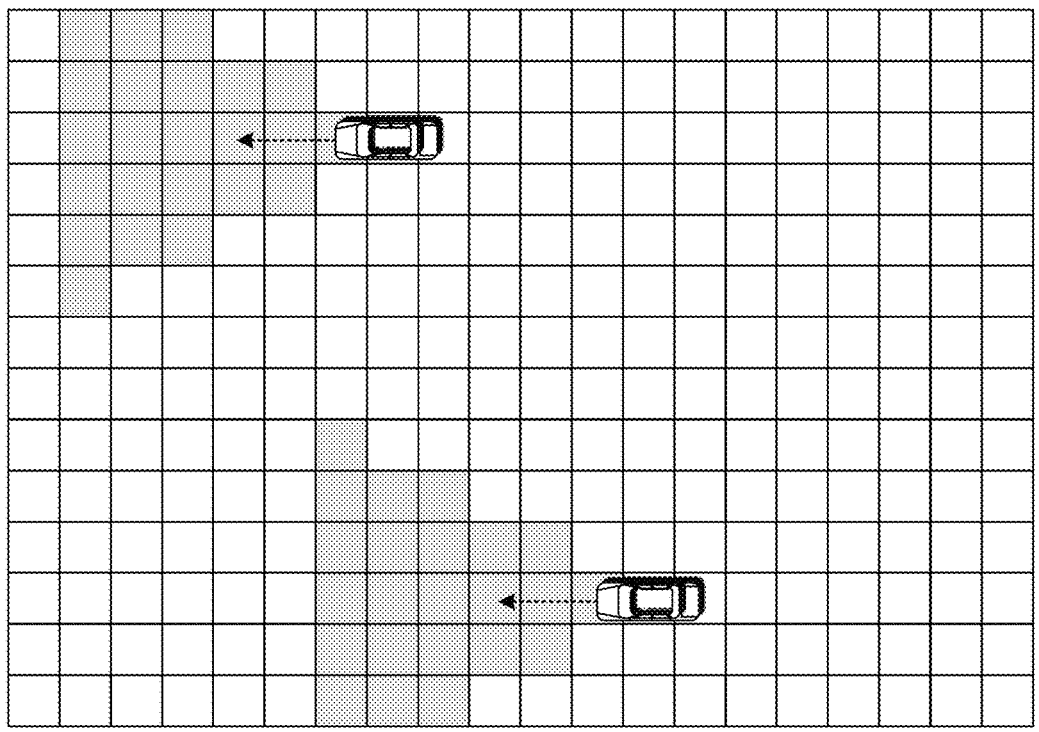
FIG. 5 is an illustration of example occupancy outputs corresponding to an environment surrounding a vehicle.
Figure 5:
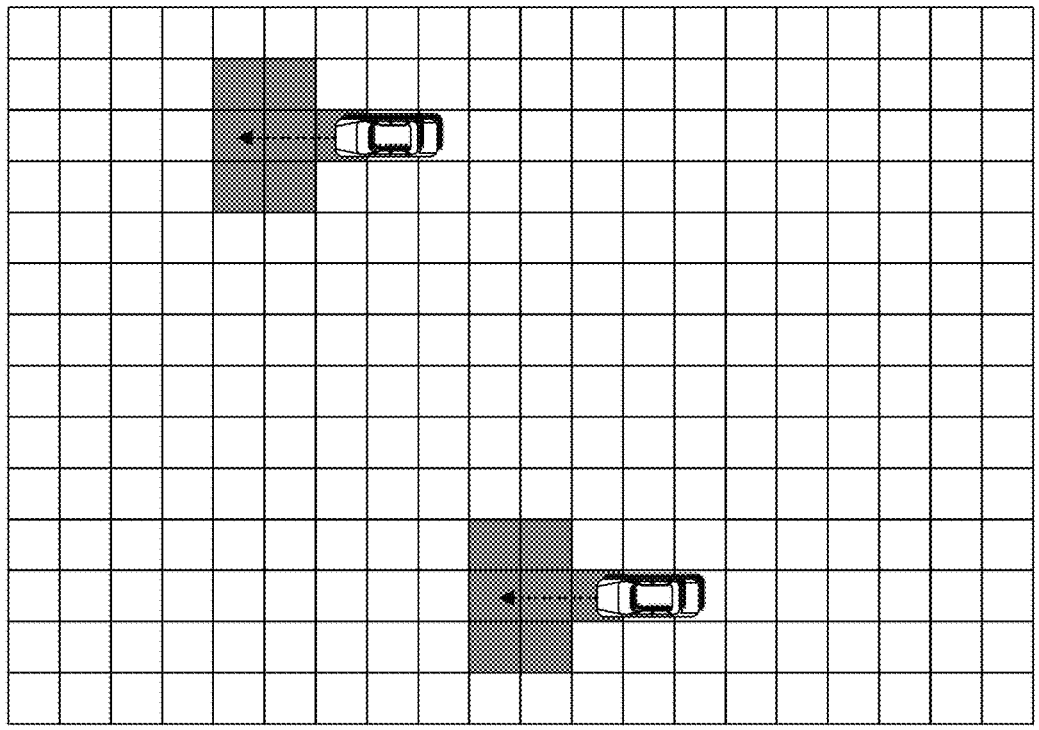

FIG. 5 is an illustration of example occupancy outputs 510 and 520 corresponding to an environment surrounding a vehicle. The environment contains two surrounding agents. While the two surrounding agents are illustrated as automobiles, it should be understood that the surrounding agents can be an agent of any appropriate type, e.g., pedestrians, cyclists, etc.

The occupancy outputs 510 and 520 are example two-dimensional arrays generated by a trained occupancy prediction system, e.g., the occupancy prediction system 400 depicted in FIG. 4. The arrays each represents a "top-down" perspective of the environment, where each position corresponds to a respective location in the environment.

In some implementations where the input to the occupancy prediction system is scene data represented as two-dimensional arrays, e.g., the channels depicted in FIGS. 2A and 2B, the occupancy output arrays can have the same dimensions as the input arrays, so that a position in an output array characterizes the same location in the environment as the corresponding position in the input array.

The value at each position of an occupancy output corresponds to the occupancy probability of the respective location. In some implementations, an image can be created depicting the occupancy output, where a respective block of one or more pixels corresponds to each position in the array, and higher occupancy probabilities are depicted as darker grayscale values of the respective block of pixels. Such an image can be useful during training of the occupancy prediction system, e.g., to allow a user to visually inspect the progress of the training of the system.

The first occupancy output 510 corresponds to a requested future time point that is in the relatively near future, e.g., 1 second. For each of the two surrounding agents, the positions in the first occupancy output 510 that have a non-zero occupancy probability are illustrated in dark-gray. The dark-gray positions can, for example, signify an occupancy probability of $0.14 \approx 1/7$, because there are 7 non-zero occupancy probabilities per surrounding agent. The first occupancy output 510 is a simplification; it should be understood that the respective occupancy probability of each position could all be different.

For example, there could be one or more locations that are reachable by both surrounding agents. In this case, the occupancy probability for these locations will be higher than for surrounding locations because it characterizes the collected likelihood that either one of the surrounding agents will occupy the location, or both.

Generally, the sum of all occupancy probabilities in an occupancy output generated by a trained occupancy prediction system is proportional to the number of surrounding agents However, as discussed above, the sum of all occupancy probabilities in an occupancy output could be less than the number of surrounding agents if one or more surrounding agents are likely to exit the environment, i.e., move to a location that is not represented in the occupancy output, or more than the number of surrounding agents if some surrounding agents are likely to occupy more than one location or if one or more surrounding agents are likely to enter the environment, i.e., enter from a location that is not represented in the occupancy output.

That is, during training of the occupancy prediction system, the occupancy prediction system can process training examples where surrounding agents that were not in the environment at the current time point corresponding to the training example enter the environment, and are therefore represented in the ground truth occupancy output. The occupancy prediction can also process training examples where surrounding agents that were in the environment at the current time point corresponding to the training example exits the environment, and are therefore not represented in the ground truth occupancy output. By generating parameter updates for the occupancy prediction system using errors in the occupancy outputs generated by the occupancy predictions system in response to processing such training examples, a training system can train the occupancy prediction system to be able to predict when surrounding agents will enter or exit the environment using the input scene data. As a particular example, if a training example characterizes a surrounding agent near the edge of the environment moving fast towards the edge of the environment, then the occupancy prediction system can learn that the surrounding agent is likely to leave the environment. As another particular example, if roadgraph information in the scene data characterizes a green light near the edge of the environment for traffic moving into the environment, then the occupancy prediction system can learn that a surrounding agent is likely to enter the environment.

The second occupancy output 520 corresponds to a requested future time point that is relatively distant compared to the first occupancy output 510, e.g., 2 seconds. For each of the two surrounding agents, the positions in the second occupancy output 520 that have a non-zero occupancy probability are illustrated in light-gray. The light-gray positions can, for example, signify an occupancy probability of 0.04≈1/23, because there are 23 non-zero occupancy probabilities per surrounding agent. Here, the occupancy probability are more evenly distributed because the requested future time point is more distant, and therefore the behavior of the surrounding agents is more uncertain. In general, a longer time horizon leads to more diffusion of the occupancy probabilities.

Figure 6:
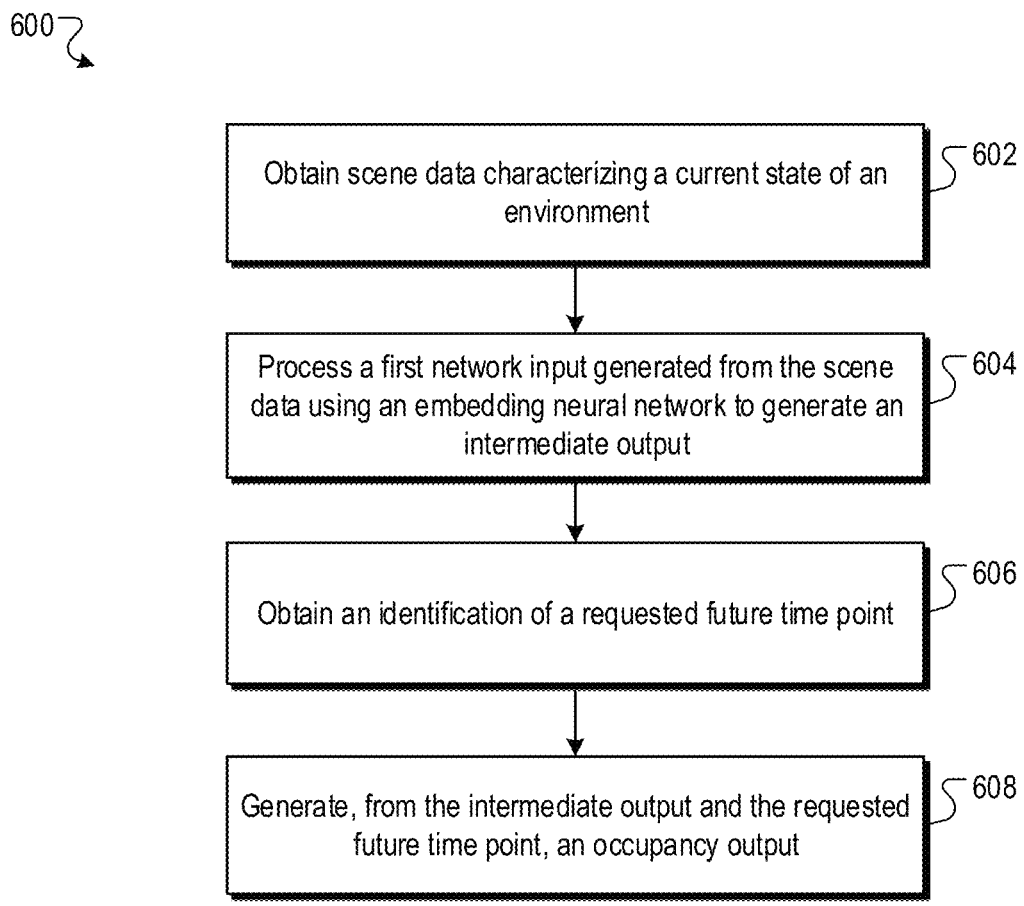
FIG. 6 is a flow diagram of an example process for generating an occupancy output.

FIG. 6 is a flow diagram of an example process 600 for generating an occupancy output. For convenience, the process 600 will be described as being performed by a system of one or more computers located in one or more locations. For example, an on-board system, e.g., the on-board system 110 of FIG. 1, appropriately programmed in accordance with this specification, can perform the process 600.

The system obtains scene data that characterizes an environment at a current time point (step 602). The scene data can include, for each of one or more surrounding agents in the environment, i) a current location and current values for a predetermined set of motion parameters of the agent, and ii) a previous location and previous values for the predetermined set of motion parameters of the agent for each of one or more previous time points. For example, the scene data can include the channels discussed in FIGS. 2A and 2B.

The system processes a first network input generated from the scene data using an embedding neural network to generate an intermediate output (step 604).

The system obtains an identification of a requested future time point that is after the current time point (step 606). In some implementations, the identification of the requested future time point is obtained from a planner of a vehicle operating in the environment.

The system generates, from the intermediate output and the requested future time point, an occupancy output (step 608). In some implementations, the occupancy output includes a two-dimensional array of data values, where each position in the array corresponds to a respective location in the environment, and where the data values each characterize the occupancy probability of the respective location.

In some implementations, the intermediate output is a machine-learned representation of the first network input. In these implementations, the system can generate the occupancy output by processing the intermediate output and the identification of the requested future time point using a second neural network, e.g., a neural network that is in the occupancy output generation subsystem 430 depicted in FIG. 4. In some such implementations, the second neural network has fewer parameters than the embedding neural network, and therefore can efficiently generate multiple occupancy outputs for respective requested future time points. In some such implementations, the embedding neural network and the second neural network are trained end-to-end, e.g., using a training data set of training examples, where each training example has a respective training future time point and a ground-truth occupancy output generated from the training future time point. In some such implementations, the requested future time point obtained in step 606 is not the same as any of the training future time point. That is, the system has never generated an occupancy output for that particular requested future time point before.

In some other implementations, the intermediate output includes, for each location in the environment, i) a predicted enter time and a predicted exit time that define a future time interval, and ii) a first probability that represents a confidence that a surrounding agent will occupy the location in the future time interval. That is, the first probability characterizes whether a surrounding agent will actually enter and exit the location in the time horizon defined by the first two values. In these implementations, the system can generate the occupancy output by determining, for each location in the environment, whether the requested future time point is between the predicted enter time and the predicted exit time of the location. If the requested future time point is between the predicted enter time and the predicted exit time of the location, then the system determines the occupancy probability for the location to be equal to the first probability of the location. If the requested future time point is not between the predicted enter time and the predicted exit time of the location, the system determines the occupancy probability for the location to be zero.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

obtaining scene data characterizing an environment at a current time point;

processing a first network input generated from the scene data using a first neural network to generate an intermediate output;

obtaining an identification of a future time point that is after the current time point; and generating, from the intermediate output and the future time point, an occupancy output, wherein the occupancy output comprises respective occupancy probabilities for each of a plurality of locations in the environment, wherein the respective occupancy probability for each location characterizes a likelihood that one or more agents will occupy the location at the future time point.

Embodiment 2 is the method of embodiment 1, wherein the scene data comprises, for each of one or more agents in the environment:

a current location and current values for a predetermined set of motion parameters of the agent; and a previous location and previous values for the predetermined set of motion parameters of the agent for each of one or more previous time points.

Embodiment 3 is the method of any one of embodiments 1 or 2, wherein the intermediate output is a machine-learned representation of the first network input.

Embodiment 4 is the method of embodiment 3, wherein generating the occupancy output comprises:

processing a second network input comprising the intermediate output and the identification of the future time point using a second neural network to generate the occupancy output.

Embodiment 5 is the method of embodiment 4, wherein the second neural network has fewer parameters than the first neural network.

Embodiment 6 is the method of any one of embodiments 4 or 5, wherein the first neural network and the second neural network are trained end-to-end.

Embodiment 7 is the method of any one of embodiments 4-6, wherein:

the second neural network has been trained on a training data set comprising a plurality of training examples having respective training future time points; and the future time point is not included in the plurality of training future time points.

Embodiment 8 is the method of any one of embodiments 1 or 2, wherein the intermediate output comprises, for each of the plurality of locations in the environment:

a predicted enter time and a predicted exit time that define a future time interval in which a surrounding agent will occupy the location, and a first probability that represents a confidence that the predicted enter time and predicted exit time are accurate.

Embodiment 9 is the method of embodiment 8, wherein generating the occupancy output comprises, for each of the plurality of locations in the environment:

determining whether the future time point is between the predicted enter time and the predicted exit time of the location;

in response to determining that the future time point is between the predicted enter time and the predicted exit time of the location, generating the occupancy probability for the location to be equal to the first probability of the location; and in response to determining that the future time point is not between the predicted enter time and the predicted exit time of the location, generating the occupancy probability for the location to be zero.

Embodiment 10 is the method of any one of embodiments 1-9, wherein the identification of the future time point is obtained from a planner of a vehicle in the environment.

Embodiment 11 is the method of any one of embodiments 1-10, wherein the occupancy output comprises a two-dimensional array of data values, wherein each position in the array corresponds to a respective location in the environment, and wherein the data values each characterize the occupancy probability of the respective location.

Embodiment 17 is a system comprising: one or more computers and one or more storage devices storing instructions that are operable, when executed by the one or more computers, to cause the one or more computers to perform the method of any one of embodiments 1 to 16.

Embodiment 18 is a computer storage medium encoded with a computer program, the program comprising instructions that are operable, when executed by data processing apparatus, While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:

obtaining scene data characterizing an environment at a current time point;

receiving a request from a planning system of an autonomous vehicle for a respective occupancy prediction at each of multiple future time points that are each after the current time point, wherein each future time point corresponds to a different time interval into the future relative to the current time point;

processing a first network input generated from the scene data using a first neural network to generate an embedding of the environment at the current time point;

processing a plurality of different inputs using a second neural network, wherein each of the plurality of different inputs includes (i) the embedding of the environment at the current time point and (ii) a different one of the time intervals into the future relative to the current time point, and wherein for each of the plurality of different inputs, the second neural network is configured to generate an occupancy output for the future time interval in the input that comprises respective occupancy probabilities for each of a plurality of locations in the environment, wherein the respective occupancy probability for each location characterizes a likelihood that one or more agents will occupy the location after the future time interval; and providing, to the planning system, the respective occupancy outputs for the multiple future time points.

2. The method of claim 1, wherein the scene data comprises, for each of one or more agents in the environment:
   a current location and current values for a predetermined set of motion parameters of the agent; and
   a previous location and previous values for the predetermined set of motion parameters of the agent for each of one or more previous time points.

3. The method of claim 1, wherein the embedding is a machine-learned representation of the first network input.

4. The method of claim 1, wherein the second neural network has fewer parameters than the first neural network.

5. The method of claim 1, wherein the first neural network and the second neural network are trained end-to-end.

6. The method of claim 1, wherein:
   the second neural network has been trained on a training data set comprising a plurality of training examples having respective training future time points; and
   one or more of the future time points are not included in the plurality of training future time points.

7. The method of claim 1, wherein the occupancy output comprises a two-dimensional array of data values, wherein each position in the array corresponds to a respective location in the environment, and wherein the data values each characterize the occupancy probability of the respective location.

8. A system comprising one or more computers and one or more storage devices storing instructions that are operable, when executed by the one or more computers, to cause the one or more computers to perform operations comprising:
   obtaining scene data characterizing an environment at a current time point;
   receiving a request from a planning system of an autonomous vehicle for a respective occupancy prediction at each of multiple future time points that are each after the current time point, wherein each future time point corresponds to a different time interval into the future relative to the current time point;
   processing a first network input generated from the scene data using a first neural network to generate an embedding of the environment at the current time point;
   processing a plurality of different inputs using a second neural network,
   wherein each of the plurality of different inputs includes (i) the embedding of the environment at the current time point and (ii) a different one of the time intervals into the future relative to the current time point, and
   wherein for each of the plurality of different inputs, the second neural network is configured to generate an occupancy output for the future time interval in the input that comprises respective occupancy probabilities for each of a plurality of locations in the environment at the future time point, wherein the respective occupancy probability for each location characterizes a likelihood that one or more agents will occupy the location after the future time interval; and
   providing, to the planning system, the respective occupancy outputs for the multiple future time points.

9. The system of claim 8, wherein the scene data comprises, for each of one or more agents in the environment:
   a current location and current values for a predetermined set of motion parameters of the agent; and
   a previous location and previous values for the predetermined set of motion parameters of the agent for each of one or more previous time points.

10. The system of claim 8, wherein the embedding is a machine-learned representation of the first network input.

11. One or more non-transitory computer-readable storage media storing instructions that when executed by one or more computers cause the one or more computers to perform operations comprising:
   obtaining scene data characterizing an environment at a current time point;
   receiving a request from a planning system of an autonomous vehicle for a respective occupancy prediction at each of multiple future time points that are each after the current time point, wherein each future time point corresponds to a different time interval into the future relative to the current time point;
   processing a first network input generated from the scene data using a first neural network to generate an embedding of the environment at the current time point;
   processing a plurality of different inputs using a second neural network,
   wherein each of the plurality of different inputs includes (i) the embedding of the environment at the current time point and (ii) a different one of the time intervals into the future relative to the current time point, and
   wherein for each of the plurality of different inputs, the second neural network is configured to generate an occupancy output for the future time interval in the input that comprises respective occupancy probabilities for each of a plurality of locations in the environment, wherein the respective occupancy probability for each location characterizes a likelihood that one or more agents will occupy the location after the future time interval; and
   providing, to the planning system, the respective occupancy outputs for the multiple future time points.

12. The system of claim 11, wherein the embedding is a machine-learned representation of the first network input.

13. The system of claim 8, wherein the second neural network has fewer parameters than the first neural network.

14. The system of claim 8, wherein the first neural network and the second neural network are trained end-to-end.

15. The system of claim 8, wherein:
   the second neural network has been trained on a training data set comprising a plurality of training examples having respective training future time points; and
   one or more of the future time points are not included in the plurality of training future time points.

16. The system of claim 8, wherein the occupancy output comprises a two-dimensional array of data values, wherein each position in the array corresponds to a respective location in the environment, and wherein the data values each characterize the occupancy probability of the respective location.

17. The computer-readable storage media of claim 11, wherein the second neural network has fewer parameters than the first neural network.

18. The computer-readable storage media of claim 11, wherein the first neural network and the second neural network are trained end-to-end.

19. The computer-readable storage media of claim 11, wherein:
   the second neural network has been trained on a training data set comprising a plurality of training examples having respective training future time points; and one or more of the future time points are not included in the plurality of training future time points.

\* \* \* \* \*